May 24, 1932.  H. A. THORNTON  1,859,685
SAFETY APPARATUS FOR AEROPLANES
Filed April 6, 1931    3 Sheets-Sheet 1

May 24, 1932.  H. A. THORNTON  1,859,685
SAFETY APPARATUS FOR AEROPLANES
Filed April 6, 1931  3 Sheets-Sheet 2

H. A. Thornton
Inventor

By C. A. Snow & Co.
Attorneys.

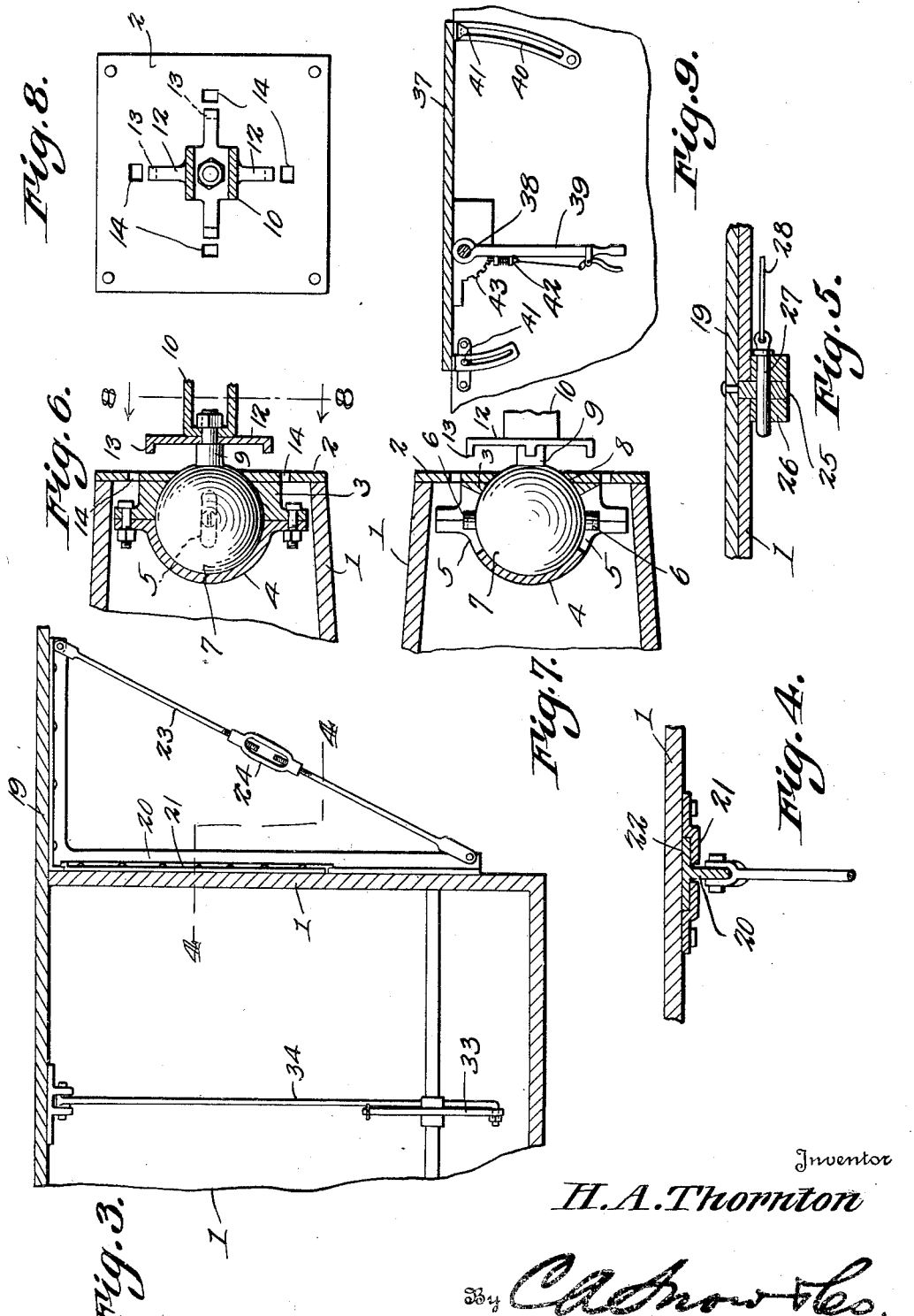

Patented May 24, 1932

1,859,685

UNITED STATES PATENT OFFICE

HIRAM A. THORNTON, OF VINCENNES, INDIANA

SAFETY APPARATUS FOR AEROPLANES

Application filed April 6, 1931. Serial No. 528,138.

This invention relates to safety apparatus for use on an aeroplane for the purpose of bringing it out of an uncontrolled nose-dive or tail-spin.

A further object is to provide an aeroplane with a supplemental safety plane capable of swinging away from the fuselage either at the front or the back thereof, depending on whether the machine is falling nose first or tail first, the action of this plane being such as to deflect the advancing part of the machine upwardly so as to bring the fuselage to a point where the controls commonly used can be brought into effective action.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings, the preferred form of the invention has been shown.

In said drawings:

Figure 3 is an enlarged section through a portion of the aeroplane taken on the line 3—3, Figure 2.

Figure 4 is a section on line 4—4, Figure 3.

Figure 5 is a section through a latch used for holding the safety plane in normal position, this section being on an enlarged scale and taken on line 5—5, Figure 1.

Figure 6 is an enlarged horizontal section through the connection between the tail planes and fuselage.

Figure 7 is an enlarged vertical section therethrough.

Figure 8 is a section on line 8—8, Figure 6.

Figure 9 is a detailed view showing a modified means for actuating the supplemental plane.

Figure 1:
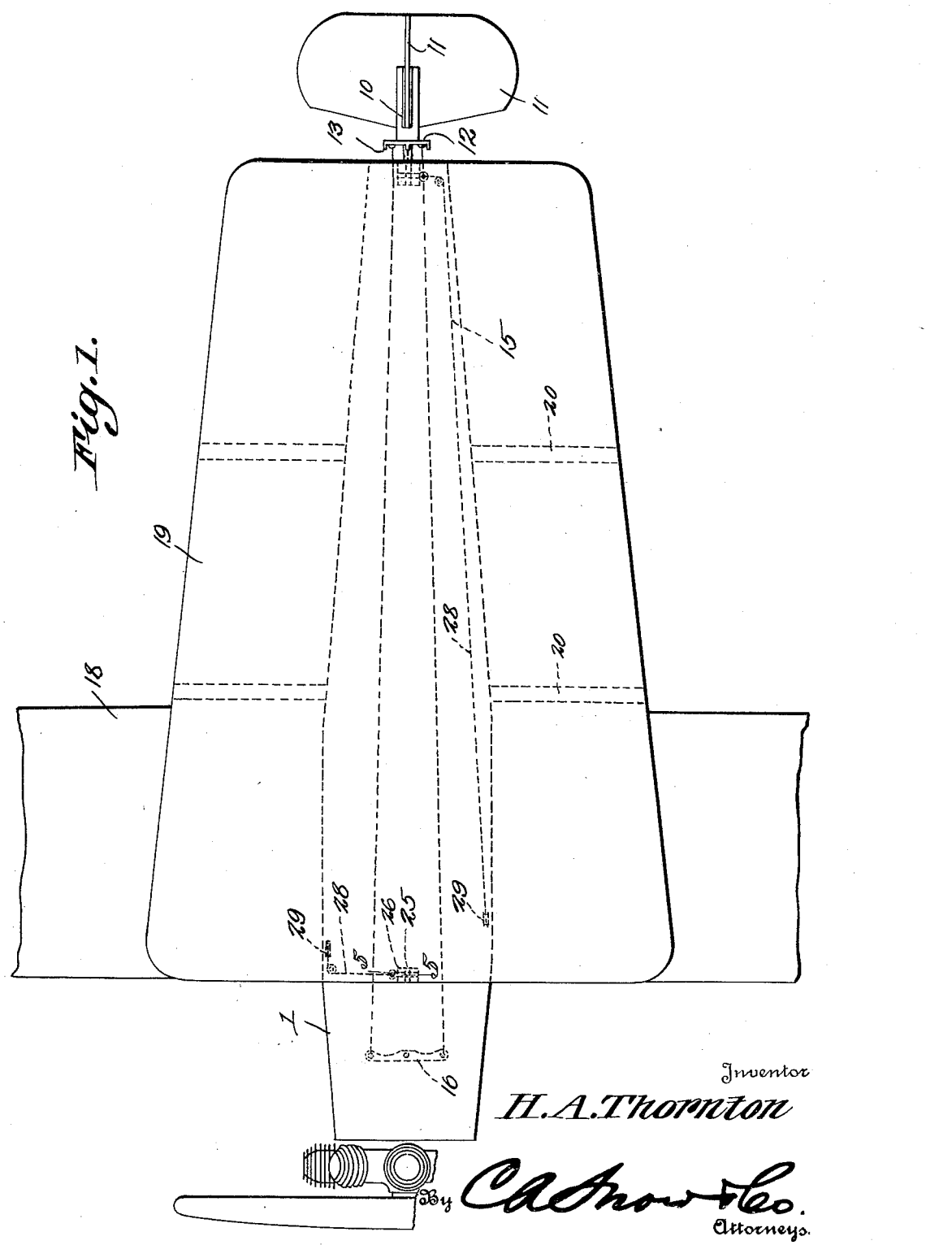
Figure 1 is a plan view of a portion of an aeroplane equipped with the safety apparatus constituting the present invention.
Figure 2:
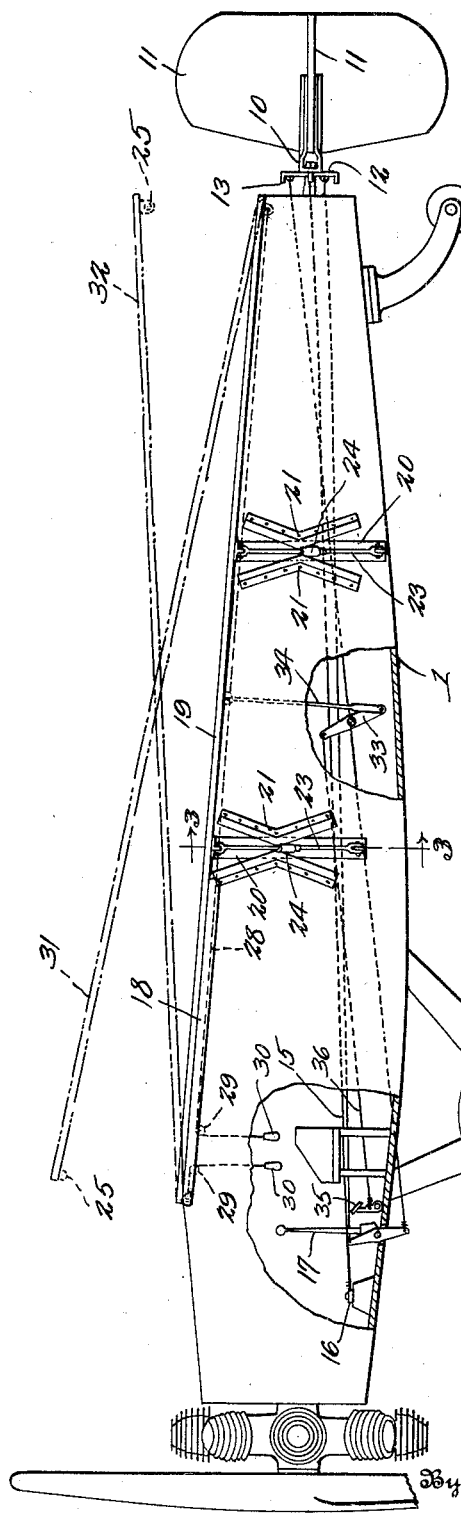
Figure 2 is a side elevation thereof, parts being broken away and the safety plane being shown by dotted lines in two different positions which can be assumed thereby.

Referring to the figures by characters of reference, 1 designates the fuselage of an aeroplane which can be of any desired construction. Secured to the rear end of the fuselage is a plate 2 carrying a concave or socket member 3 to which is secured a concavo-convex cap 4. At diametrically opposed points in the same horizontal plane are arcuate slots 5 formed in the socket member 3 and cap 4 and these slots constitute guides for trunnions 6 extending in opposite directions from a ball 7. The ball is fitted snugly in the socket member and cap and projects through an opening 8 in the plate 2.

A stem 9 is formed on the projecting portion of the ball and is connected by a yoke 10 or the like to the crossed tail planes or rudders 11.

Arms 12 are secured to and radiate from stem 9. Each of these arms has a terminal stud 13 projecting toward plate 2. Formed in the plate are openings 14 so located that when the tail planes are swung upwardly or downwardly either the upper stud 13 or the lower stud 13 will enter one of the openings 14, and when the tail planes are swung to the right or to the left one or the other of the side studs 13 will enter the adjacent side opening 14. Thus when the tail planes are shifted angularly beyond a predetermined distance they will be locked against rotation and reinforced against torsional strain. The tail planes can be operated by any suitable means provided for that purpose such as cables 15 extending from the side arms 12 to a foot lever 16 and from the upper and lower arms to a hand lever 17.

Mounted on a sustaining plane 18 of the aeroplane is a supplemental or safety plane 19 which, in practice, is of a width equal to approximately one-third of the distance from tip to tip. This safety plane is centered over the fuselage and is provided adjacent to its center with depending brackets 20 which extend downwardly at the sides of the fuselage 1 between opposed V-shaped guides 21. These guides are preferably angular in cross section as shown particularly in Figures 4 so as to lap the base flanges 22 of brackets 20 which are T-shaped as shown. The brackets can be reinforced by means of brace or tie rods 23 having turnbuckles 24. By providing the V-shape guides 21 the brackets can be held against lateral shifting to an objectionable extent relative to the fuselage but will, at the same time, be capable of swinging upwardly about either the front or back end of the safety plane as a center.

Depending from each end of the safety plane is a lug 25 normally seated between stationary ears 26 carried by the fuselage. This lug is adapted to receive a latch bolt 27 slidable in the ears 26 and having any suitable means connected thereto whereby it can be quickly disengaged from lug 25. For example, each bolt can have a cord 28 extending therefrom over suitable guide pulleys 29 and a handle 30 located where it can be conveniently reached by the pilot. Normally both bolts are seated in the lug 25 so that the safety plane cannot be moved relative to the fuselage.

Assuming that the aeroplane is out of control and making a dive with its nose first, the pilot pulls upon the cord connected to the front bolt. Thus the front end of the safety plane will be released and will be swung outwardly by pressure of air thereagainst substantially to the position indicated by broken lines at 31. The tail planes can be thrown upwardly by the operator so as to cause one of the studs 13 to enter its opening 14. Thus twisting or turning of the tail planes is prevented and at the same time the shifted safety plane will be brought into action and tend to swing the fuselage into position where the usual controls can be made effective.

Should the aeroplane be descending tail first, the other bolt would be withdrawn and the safety plane would swing substantially to the position shown by broken lines at 32. In this event the tail planes would also be shifted and locked.

For the purpose of starting the safety plane to active position after it has been released, a lever 33 can be pivotally mounted in the fuselage and connected at one end to the safety plane by a push rod 34. The other end of the lever can be connected to a foot lever 35 by a cable 36. By pushing on the foot lever the push rod will thrust against the released safety plane and insure its movement away from the fuselage.

Instead of releasing and operating the safety plane as described it might be desired to tiltably mount the plane as shown in Figure 9. In said figure, safety plane 37 is secured to a rotatable shaft 38 and a lever 39 extends downwardly from and is secured to this shaft. Slotted arcuate strips 40 are secured to and extend downwardly from the front and back portions of the plane and are concentric with shaft 38. Extending into these strips are guide lugs 41 for limiting the tilting movement of the plane.

Lever 39 can be locked by the usual pawl 42 and secured to the toothed segment 43.

In an emergency the pilot releases lever 39 from segment 43 and swings it forwardly or backwardly until the safety plane is brought to the desired angle whereupon it can be locked by releasing pawl 42.

Although the plane 19 has been described as overlying the sustaining plane 18, it is to be understood that the sustaining plane can be removed from beneath the safety plane.

What is claimed is:

1. The combination with an aeroplane structure, of a safety plane centered upon and supported by the fuselage, pivotal connections between the front and back edges of said plane and the fuselage cooperating to hold the plane against movement, cooperating means on the safety plane and the fuselage for guiding said plane when tilted about either its front or its back pivotal connection, means for disengaging the safety plane at either of its pivotal connections, and means for shifting the safety plane when disengaged to swing it about its other pivotal connection.

2. The combination of an aeroplane structure, of a safety plane centered thereon, pivotal connections between the fuselage of the aeroplane structure and the front and back edges respectively of the safety plane, means for releasing either of said connections to permit tilting movement of the plane about its other connection, and means for holding the safety plane against lateral or longitudinal displacement relative to the fuselage while said plane is in any of its positions.

3. The combination with an aeroplane structure, of a safety plane centered thereon, pivotal connections between the fuselage of the aeroplane structure and the front and back edges respectively of the safety plane, means for releasing either of said connections to permit tilting movement of the plane about its other connection, and means for holding the safety plane against lateral or longitudinal displacement relative to the fuselage while said plane is in any of its positions, said means including opposed spaced diverging guides, and brackets depending from the plane and tiltably and slidably mounted between the guides.

4. The combination with an aeroplane structure, of a safety plane centered upon and supported by the fuselage, pivotal connections between the front and back edges of said plane and the fuselage cooperating to hold the plane against movement, means for guiding said plane when tilted about its front or its back pivotal connection, means for disengaging the safety plane at either of its pivotal connections, and means for shifting the safety plane when disengaged to swing it about its other pivotal connection.

5. The combination with an aeroplane structure, of a safety plane centered upon and supported by the fuselage, pivotal connections between the front and back edges of said plane and the fuselage cooperating to hold the plane against movement, means for guiding said plane when tilted about its front or its back pivotal connection, means for disengaging the safety plane at either of its pivotal connections, a tail plane pivotally connected to the fuselage and means for simultaneously shifting the tail plane and the safety plane to move them about their respective pivotal connections to bring the aeroplane out of a dive.

In testimony that I claim the foregoing as my own, I have hereto affixed my signature.

HIRAM A. THORNTON.